United States Patent
Cazzaniga et al.

(10) Patent No.: US 9,097,525 B2
(45) Date of Patent: Aug. 4, 2015

(54) DRIVING CIRCUIT FOR A MICROELECTROMECHANICAL GYROSCOPE AND RELATED MICROELECTROMECHANICAL GYROSCOPE

(71) Applicant: STMicroelectronics S.r.l., Agrate Brianza (IT)

(72) Inventors: Gabriele Cazzaniga, Rosate (IT); Luca Coronato, Corsico (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 324 days.

(21) Appl. No.: 13/660,954

(22) Filed: Oct. 25, 2012

(65) Prior Publication Data
US 2013/0104652 A1    May 2, 2013

(30) Foreign Application Priority Data

Oct. 27, 2011 (IT) .............................. TO2011A0979

(51) Int. Cl.
| | |
|---|---|
| G01C 19/56 | (2012.01) |
| G01C 19/5762 | (2012.01) |
| G01C 19/5776 | (2012.01) |
| G01C 19/5726 | (2012.01) |

(52) U.S. Cl.
CPC ........ G01C 19/5762 (2013.01); G01C 19/5726 (2013.01); G01C 19/5776 (2013.01)

(58) Field of Classification Search
CPC ........... G01C 19/5762; G01C 19/5726; G01C 19/5776

USPC ............... 73/504.12, 504.14, 504.16, 504.04, 73/504.02

See application file for complete search history.

(56) References Cited

U.S. PATENT DOCUMENTS

| | | | |
|---|---|---|---|
| 7,481,111 B2 * | 1/2009 | Caminada et al. | 73/514.18 |
| 8,225,661 B2 * | 7/2012 | Mori et al. | 73/504.12 |
| 8,474,317 B2 * | 7/2013 | Rizzo Piazza Roncoroni et al. | 73/504.12 |
| 2007/0144256 A1 * | 6/2007 | Mori et al. | 73/504.12 |
| 2008/0190199 A1 * | 8/2008 | Prandi et al. | 73/504.12 |
| 2009/0084180 A1 * | 4/2009 | Yoshida et al. | 73/504.02 |
| 2010/0326189 A1 * | 12/2010 | Sato et al. | 73/504.12 |
| 2011/0061461 A1 * | 3/2011 | Yoshida | 73/504.12 |
| 2011/0197675 A1 * | 8/2011 | Caminada et al. | 73/504.12 |

FOREIGN PATENT DOCUMENTS

| | | |
|---|---|---|
| EP | 2 166 308 A1 | 3/2010 |
| EP | 2 259 019 A1 | 12/2010 |

* cited by examiner

*Primary Examiner* — Helen Kwok
(74) *Attorney, Agent, or Firm* — Seed IP Law Group PLLC

(57) ABSTRACT

A driving circuit for a gyroscope device provided with a micromechanical detection structure having a driving mass, which is driven in resonance condition and elastically coupled to which is a sensing mass for enabling detection of angular velocity; the driving circuit has: a set of driving electrodes, coupled to the driving mass; a driving stage supplying driving signals to the set of driving electrodes to cause oscillation in resonance condition of the driving mass; and a reading stage, which detects movement of the driving mass to implement a feedback control of the driving signals. In particular, the reading stage is selectively coupleable to the set of driving electrodes in a way temporally alternative to the driving stage, for discrete-time detection of the movement of the driving mass.

23 Claims, 6 Drawing Sheets

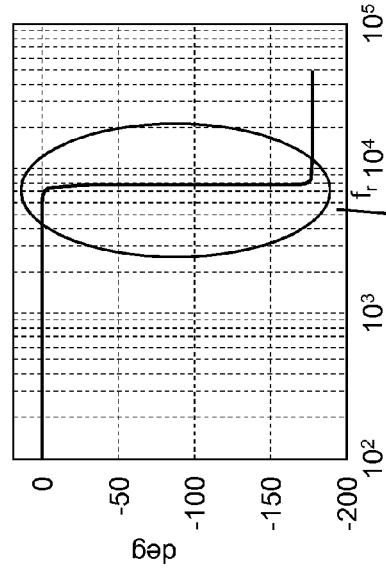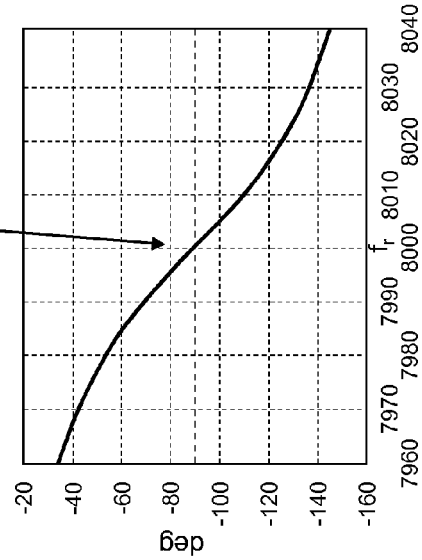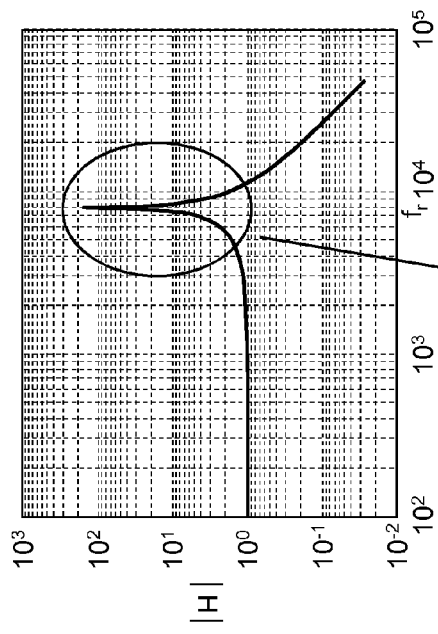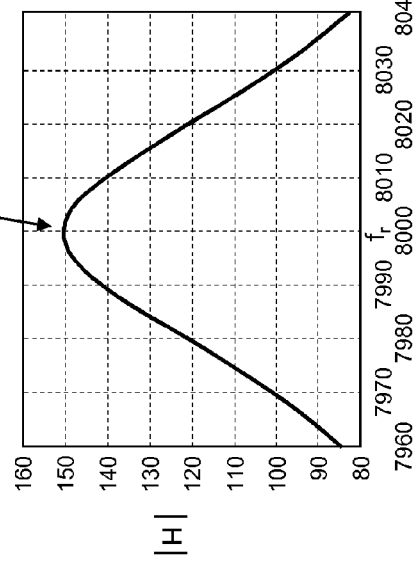

DRIVING CIRCUIT FOR A MICROELECTROMECHANICAL GYROSCOPE AND RELATED MICROELECTROMECHANICAL GYROSCOPE

BACKGROUND

1. Technical Field

The present disclosure relates to a driving circuit for a microelectromechanical gyroscope and to a related microelectromechanical gyroscope.

2. Description of the Related Art

As is known, micromachining techniques enable manufacturing of microelectromechanical structures or systems (MEMS) within layers of semiconductor material, which have been deposited (for example, a layer of polycrystalline silicon) or grown (for example, an epitaxial layer) on top of sacrificial layers, which are removed via chemical etching.

Inertial sensors, such as accelerometers and gyroscopes, built using said technology are enjoying an increasing success, for example, in the automotive field, in inertial navigation, or in the sector of portable devices.

In particular, integrated gyroscopes made of semiconductor material using MEMS technology are known. These gyroscopes operate based on the theorem of relative accelerations, exploiting Coriolis acceleration. When an angular velocity is applied to a mobile mass that is driven with a linear velocity, the mobile mass "feels" an apparent force, known as Coriolis force, which determines a displacement thereof in a direction perpendicular to the direction of the linear velocity and to the axis about which the angular velocity is applied. The mobile mass is supported via springs that enable a relative displacement thereof in the direction of the apparent force. According to Hooke's law, the displacement is proportional to the apparent force, in such a way that, from the displacement of the mobile mass, it is possible to derive the Coriolis force and the value of the angular velocity that has generated it.

The displacement of the mobile mass may, for example, be detected in a capacitive manner by determining, in a resonance condition, the variations of capacitance (or, likewise of the quantity of charge) caused by the movement of mobile electrodes, fixed with respect to the mobile mass (or constituted by parts of the same mobile mass) and coupled to fixed electrodes.

In greater detail, MEMS gyroscopes have a rather complex electromechanical structure, which comprises two masses that are mobile with respect to a same fixed body (usually defined as "stator") and are coupled together so as to have one relative degree of freedom.

One of the mobile masses is dedicated to driving (and for this reason is commonly defined as "driving mass") and is kept in oscillation at its resonance frequency by means of a suitable electronic driving circuit (or forcing circuit). The other mobile mass (usually known as "sensing mass") is drawn along in the oscillatory motion by the driving mass and, in case of rotation of the microstructure with respect to a preset axis at a given angular velocity, is subject to a Coriolis force proportional to the same angular velocity. The sensing mass thus operates as an accelerometer that enables detection of Coriolis acceleration.

As regards implementation of the electronic driving circuit, a first known solution envisages supplying, in open loop, of periodic stresses at the resonance frequency of the MEMS structure. The solution is simple, but also far from effective, because the resonance frequency is not known precisely on account of the inherent dispersions in the processes of micromachining of semiconductor materials. Moreover, the resonance frequency of each individual device may vary over time, for example, on account of temperature gradients or, more simply, owing to ageing.

Feedback driving stages have thus been proposed, in which a feedback loop is used for controlling the driving signal so as to maintain the resonance condition.

In particular, in order to enable driving and provide an electromechanical oscillator in which the sensor mechanical structure performs a role of selective frequency amplifier with a second-order transfer function of a low-pass type and high merit factor (the so-called "Q factor", equal to at least 20, but also of the order of 100 or 1000), the driving mass is coupled to two differential capacitive structures: a set of driving electrodes and a set of driving-sensing electrodes.

The driving electrodes have the purpose of enabling sustaining of self-oscillation of the mobile driving mass in the driving direction, by means of electrostatic forces generated by the spectral component of the noise at the mechanical resonance frequency of the driving mass. In particular, a driving signal is applied to the driving electrodes, for example, a voltage signal of the square-wave type, with suitable amplitude and frequency such as to cause resonance oscillation.

The driving-sensing electrodes have the purpose of enabling detection, through the transduced charge, of the translation or rotation movement of the driving mass in the driving direction in such a way as to enable a feedback control of the driving signal. In particular, movement detection is performed continuously, by processing analog signals, generally voltage signals.

Although effective for controlling resonance oscillation of the driving mass, a solution of this type is not, however, optimized from the standpoint of area occupation and costs on account of the additional presence of a set of electrodes dedicated to detection of the driving movement, which do not contribute to the system operation and to the detection of angular velocities. In particular, this solution may prove for this reason not applicable in systems where size reduction represents a fundamental design criterion.

BRIEF SUMMARY

According to the present disclosure, a driving circuit and a corresponding microelectromechanical gyroscope are provided. The driving circuit includes a set of driving electrodes coupled to a driving mass of a gyroscope and configured to drive the driving mass in resonance condition, the driving mass being elastically coupled to a sensing mass that is configured to enable detection of an angular velocity, a driving stage configured to supply driving signals to said set of driving electrodes to cause oscillation in resonance condition of said driving mass, and a reading stage configured to detect movement of said driving mass to implement a feedback control of said driving signals, said reading stage being selectively coupleable to said set of driving electrodes as the driving stage is temporarily uncoupled from the set of driving electrodes for a discrete-time detection of movement of said driving mass.

BRIEF DESCRIPTION OF THE SEVERAL VIEWS OF THE DRAWINGS

For a better understanding of the present disclosure, preferred embodiments thereof are now described, purely by way of non-limiting example, with reference to the attached drawings, wherein:

FIGS. 2a-2d shows plots related to the electrical performance of a microelectromechanical structure of the gyroscope device of FIG. 1;

DETAILED DESCRIPTION

Figure 1:
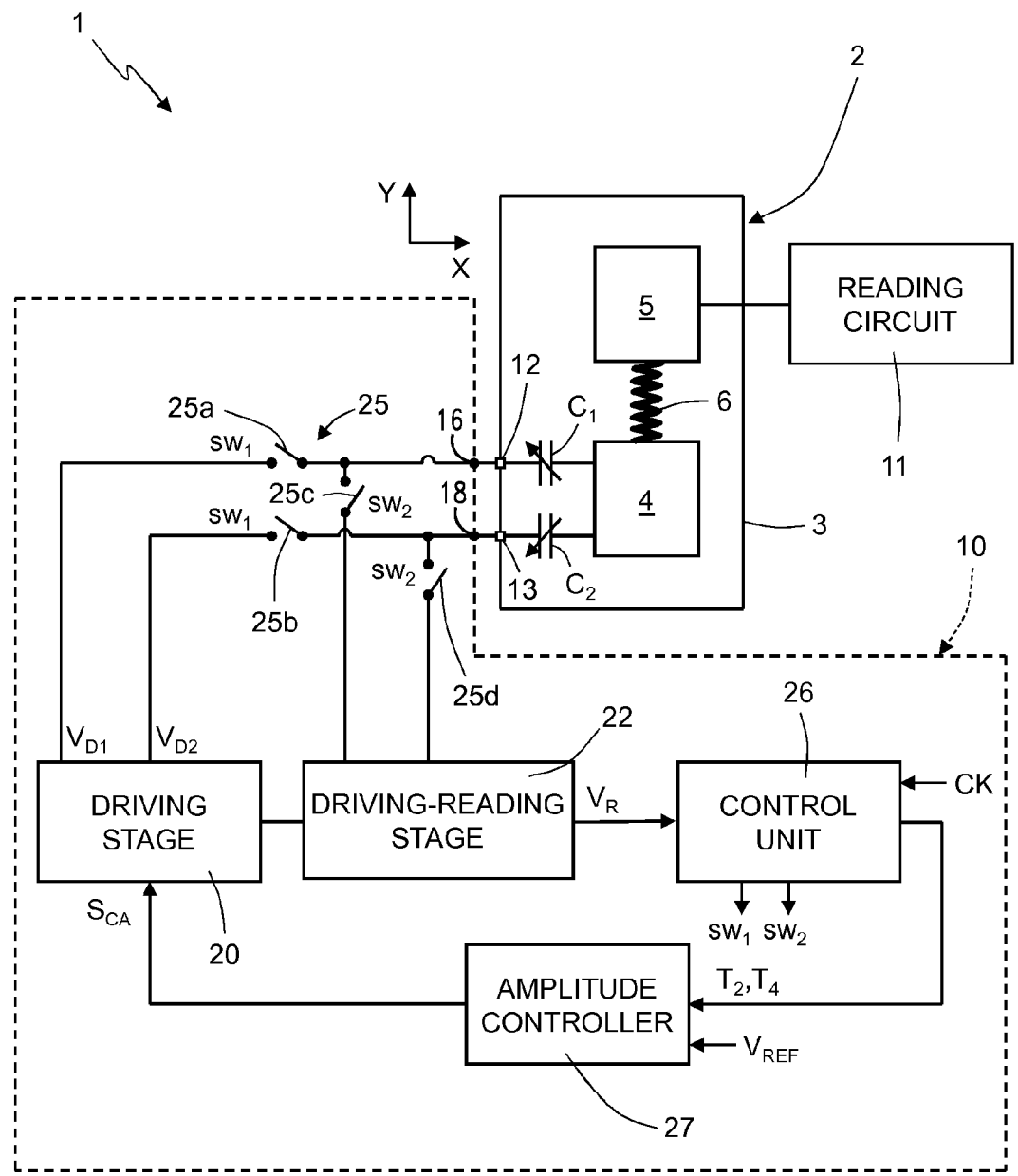
FIG. 1 shows a block diagram of a gyroscope device, including a driving circuit according to an embodiment of the present disclosure.

As shown in FIG. 1, a gyroscope device, designated as a whole by 1, comprises a microelectromechanical detection structure 2, represented schematically and including (in a known way that is not described in detail) a fixed structure (stator) 3, a driving mass 4, and a sensing mass 5. The sensing mass 5 is elastically coupled to the driving mass 4 so as to sense the resonance oscillating movement of the same driving mass 4, via suitable elastic elements 6. In addition, the sensing mass 5 has a relative movement of detection with respect to the driving mass 4, owing to the action of the Coriolis force, thus enabling angular velocity detection.

For reasons of simplicity reference is made herein to the case of a uniaxial gyroscope, where just one sensing mass 5 is present. What is described hereinafter applies, however, also in the case of multiaxial gyroscopes, which comprise two or more sensing masses, for detecting rotations according to respective independent axes. In the example illustrated, in particular, the driving mass 4 moves linearly along a driving axis X, whilst the sensing mass 5 moves with respect to the driving mass 4 along a sensing axis Y perpendicular to the driving axis X. It is understood, however, that the type of movement (translational or rotational) allowed by the degrees of freedom and the arrangement of the driving and sensing axes may vary according to the type of gyroscope.

As illustrated in FIGS. 2a-2d, the mechanical structure constituted by the driving mass 4 (and by the corresponding elements of elastic coupling with the stator 3, not illustrated in FIG. 1) has a mechanical transfer function H (which is illustrated in magnitude and phase) with a high Q merit factor (preferably comprised between 100 and 1000, in the example equal to 150), resonating at a given resonance frequency $f_r$.

The gyroscope device 1 further comprises (see again FIG. 1): a driving circuit 10, described in detail hereinafter; and a reading circuit 11, of a known type that is not described in detail herein, electrically coupled to the sensing mass 5 and configured to detect values of angular velocity starting from the capacitive variation generated by reading electrodes (not illustrated) coupled to the same sensing mass 5.

The driving circuit 10 is electrically coupled to the driving mass 4 through a first and a second output terminal 16, 18, and is configured both to cause the resonance oscillating movement thereof, and to read the movement of the same driving mass 4 so as to enable a feedback control of the driving action.

According to an aspect of the present disclosure, the microelectromechanical detection structure 2 in the gyroscope device 1 includes just one set of driving electrodes coupled to the driving mass 4, which may be used alternatively for causing the resonance oscillating movement thereof or for enabling reading of the same movement. In particular, this set of electrodes defines a first driving capacitor $C_1$, connected between the driving mass 4 and a first driving terminal 12, and a second driving capacitor $C_2$, connected between the driving mass 4 and a second driving terminal 13.

Figure 3:
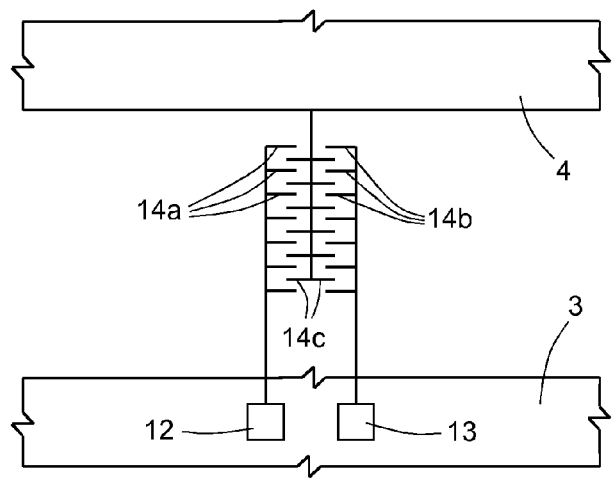
FIG. 3 shows a detail of a set of electrodes of the gyroscope device of FIG. 1.

As illustrated schematically in FIG. 3, the set of electrodes comprises first 14a and second 14b fixed electrodes, anchored to the stator 3, and mobile electrodes 14c, coupled to the driving mass 4 and combfingered and capacitively coupled to respective first and second fixed electrodes 14a, 14b. The first and second fixed electrodes 14a, 14b are electrically connected to the first and second driving terminals 12, 13, respectively, thus defining as a whole with the mobile electrodes 14c the first and second driving capacitors $C_1$, $C_2$.

The driving circuit 10 comprises a driving stage 20, configured to generate suitable driving signals $V_{D1}$, $V_{D2}$ designed to be sent through the first and the second output terminal 16, 18 of the driving circuit 10 to the first and second driving terminals 12, 13 for driving the driving mass 4. The driving stage 20 comprises, for example, a charge pump, designed to boost an input voltage and generate the high voltage values that may be required for the driving signals $V_{D1}$, $V_{D2}$, or else a variable gain amplifier (VGA).

The driving signals $V_{D1}$, $V_{D2}$ are, for example, differential signals of the square-wave type, with suitable amplitude and frequency (as described more fully hereinafter).

In particular, the driving stage 20 has a control input, designed to receive an amplitude-control signal $S_{CA}$, via which to regulate the value of amplitude of the driving signals $V_{D1}$, $V_{D2}$.

The driving circuit 10 further comprises a driving-reading stage 22, having inputs designed to be connected to the first and second driving terminals 12, 13, for reading the capacitive variations of the first and second driving capacitors $C_1$, $C_2$ and enabling detection of the movement of the driving mass 4. The driving-reading stage 22 comprises, for example, a charge amplifier, in particular of the fully differential type provided at output with a CDS (Correlated Double Sampling) stage.

The driving-reading stage 22 is in fact conveniently able to detect a position, or displacement, of the driving mass 4, and the CDS stage enables an effective control in position unaffected by contributions of offset and velocity of the driving mass 4.

In this regard, the driving stage 20 and the driving-reading stage 22 (with corresponding CDS stage) may be made as described in detail in the U.S. Patent Application Publication No. 2010/0307243, assigned to STMicroelectronics S.r.l., which is incorporated by reference in its entirety.

According to an aspect of the present disclosure, the driving circuit 10 further comprises a set of switches (or similar switching elements), designated in general by 25, set between the driving stage 20 and the output terminals 16, 18, which are coupled to the first and second driving terminals 12, 13, and between the driving-reading stage 22 and the output terminals 16, 18. The set of switches 25 can be actuated in such a way as to connect the first and second driving terminals 12, 13 alternatively to the driving unit 20, in a driving time interval, and to the driving-reading unit 22, in a reading time interval, distinct from the driving time interval.

Operation is of a discrete-time type, there being envisaged time intervals dedicated to driving and other, distinct, time intervals dedicated to reading. In general, the time intervals for reading are very short as compared to those dedicated to driving and moreover as compared to the oscillation period in such a way as to maximize the time dedicated to driving of the driving mass 3. For example, a reading time interval is comprised between one tenth (condition valid for values of oscillation frequency of just a few kilohertz) and one quarter (condition valid, for example, for a value of oscillation frequency of 20 kHz) of the value of the oscillation period.

In greater detail, the set of switches 25 comprises: a first pair of controlled switches 25a, 25b (for example, obtained using MOS transistors) connected between a respective output of the driving unit 20 and a respective one between the first and second driving terminals 12, 13, and controlled in a joint way by a first control signal sw1; and a second pair of controlled switches 25c, 25d connected between a respective input of the driving-reading unit 22 and a respective one between the first and second driving terminals 12, 13, and controlled in a joint way by a second control signal sw2.

The driving circuit 10 further comprises: a control unit 26, which is connected to the output of the driving-reading unit 22 and receives at input a reading signal $V_R$ from the same driving-reading unit 22 (for example, a voltage signal, resulting from the operation of charge amplification), and a clock signal CK (generated in a known way, not described in detail herein); and an amplitude controller 27, for example, of the PI (Proportional-Integral) type.

In particular, the control unit 26 is configured to generate the control signals sw1, sw2 for the controlled switches 25a-25d, with a suitable relative timing, as a function of the clock signal CK. In addition, the control unit 26 is configured to send the reading signal $V_R$ to the amplitude controller 27, during the reading time intervals, so as to enable a feedback control of the amplitude of the driving signals $V_{D1}$, $V_{D2}$ to be carried out (in a known way, and as described, for example, in the aforesaid U.S. Patent Application Publication No. 2010/0307243).

Alternatively (in a way not illustrated herein), the output of the driving-reading stage 22 may be directly connected to the amplitude controller 27, and the control unit 26 may be configured so as to send to the same amplitude controller 27 suitable control signals for activating amplitude control operation only in the aforesaid reading time intervals.

The amplitude controller 27 in any case has an input, which receives a reference voltage $V_{ref}$ (indicating a reference oscillation amplitude for the driving mass 4) and generates at output the amplitude-control signal $S_{CA}$, which is sent to the driving unit 20, for regulating the amplitude value of the driving signals $V_{D1}$, $V_{D2}$ in such a way as to respect the resonance conditions of oscillation of the structure (the so-called Barkhausen conditions).

Figure 4A:
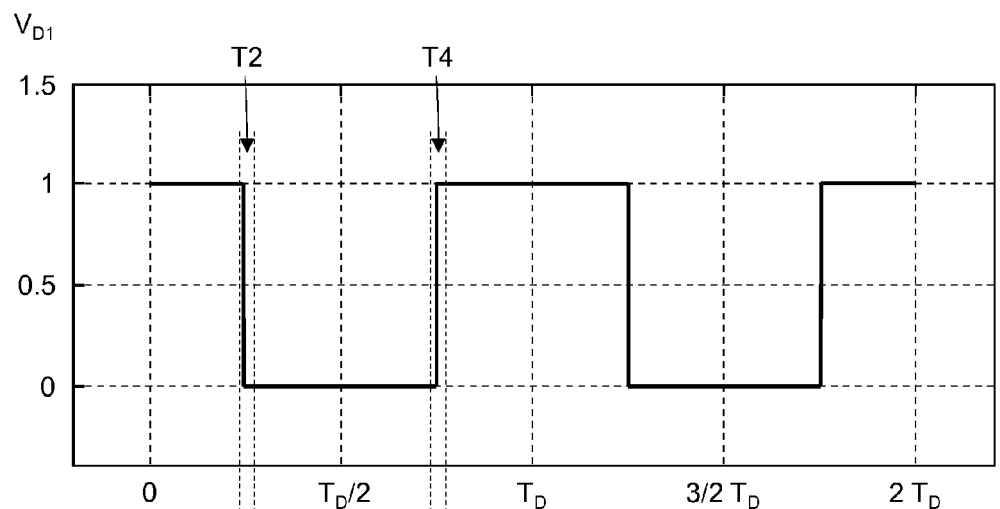
FIGS. 4a-4b shows plots related to electrical signals in the driving circuit of the gyroscope device of FIG. 1.

In one embodiment (see FIGS. 4a and 4b), the driving signals $V_{D1}$, $V_{D2}$ are periodic square-wave signals, with driving period $T_D$ (and driving frequency $f_D$, of a value as close as possible to the resonance frequency $f_r$ of the micromechanical structure). Shown, by way of example, in FIG. 4a is the driving signal $V_{D1}$ (the signal $V_{D2}$ being in phase opposition).

Figure 4B:
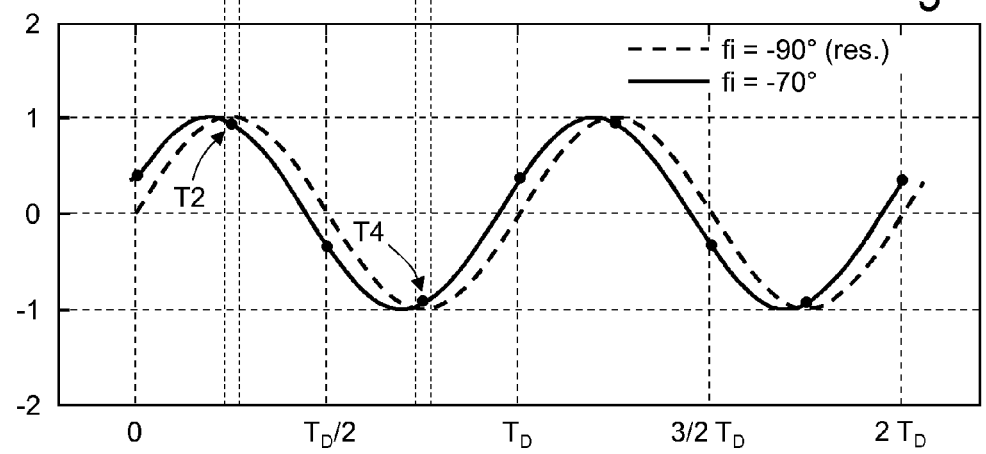

The reading signal $V_R$ is a sinusoidal signal having a period equal to the driving period $T_D$. As illustrated in FIG. 4b, the reading signal $V_R$ may have, in operating condition, a certain phase offset (or phase error $Err_{fi}$) with respect to an ideal resonance condition (represented by a dashed line in the same FIG. 4b), for example, of 20°.

In this embodiment, two reading time intervals are envisaged, designated by $T_2$ and $T_4$, centered around time instants $T_D/4$ and $3T_D/4$ (or, for the subsequent periods, $i \cdot T_D/4$ and $3i \cdot T_D/4$, i being a generic integer), dedicated to position reading for amplitude control of the driving signals $V_{D1}$, $V_{D2}$. The reading signal $V_R$ is consequently sampled at a sampling frequency $f_c$ equal to twice the driving frequency $f_d$ ($f_c = 2 \cdot f_d$). The aforesaid reading time intervals $T_2$, $T_4$ are generated by the control unit 26 in a suitable way, as a function, for example, of the clock signal CK.

During the time intervals $T_2$ and $T_4$, the set of switches 25 is thus controlled so as to connect the first and second driving terminals 12, 13 to the driving-reading unit 22, and the reading signal $V_R$ is sent by the control unit 26 to the amplitude controller 27 so as to close a microelectromechanical feedback loop for control of the amplitude of the driving signals $V_{D1}$, $V_{D2}$.

For the remaining part of the driving period $T_D$ (which has an overall duration much greater than the reading time intervals), the set of switches 25 is instead controlled so as to connect the first and second driving terminals 12, 13 to the driving unit 20, in order to supply the driving signals $V_{D1}$, $V_{D2}$ to the micromechanical structure. In other words, forcing is suspended only in the two time intervals in which reading, by means of the read unit 20, is carried out.

In greater detail, on the basis of geometrical considerations, it may be shown that the amplitude error is given by the following expression:

$$Err_{amp} = (A(T_2) - A(T_4))/2 - Amp_{ref}$$

where the term $Amp_{ref}$ is the reference amplitude for the resonance oscillation of the driving mass 4, and the term $A(T_i)$ is the amplitude of the reading signal $V_R$ at the time interval $T_j$ (with j=1, 2, 3, 4), for example, considered at the central point of the corresponding time interval.

The reading pair $T_2$, $T_4$ hence enables regulation of the oscillation amplitude. In particular, it is noted that any possible reading offset is cancelled out by the difference operation in the expression given above.

It may also be noted that control is performed as a function of the amplitude of oscillation and not of the velocity (as is usually the case in gyroscopes). However, this does not constitute a problem since, given the same frequency, velocity is proportional to amplitude, and in the case of MEMS, the resonance frequency of the system is very stable over time and in temperature.

Figure 5:
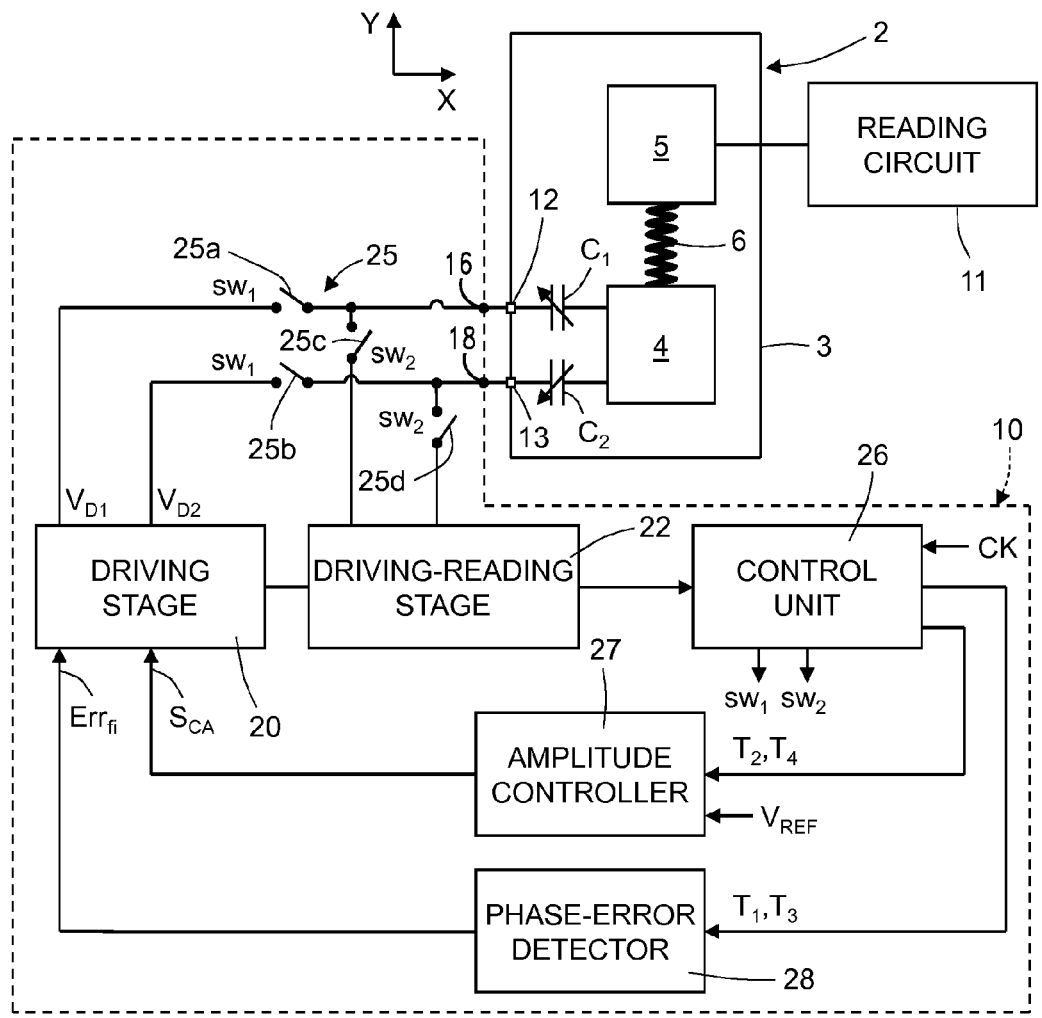
FIG. 5 shows a block diagram of a gyroscope device and of a corresponding driving circuit, according to a different embodiment of the present disclosure.

As illustrated in FIG. 5, in a further embodiment, the driving circuit, once again designated by 10, may further comprise a phase-error detector 28.

In this case, the control unit 26 is configured to send the reading signal $V_R$ alternatively to the amplitude controller 27, in first time intervals between the reading time intervals, so as to enable feedback control of the amplitude of the driving signals $V_{D1}$, $V_{D2}$ to be carried out, or else to the phase-error detector 28, in second time intervals between the reading time intervals, so as to supply further feedback information for the feedback control (of a known type, and once again as described in the aforesaid U.S. Patent Application Publication No. 2010/0307243) of the driving signals $V_{D1}$, $V_{D2}$.

In particular, two further reading time intervals, designated by $T_1$ and $T_3$, are envisaged in addition to the two reading time intervals, $T_2$ and $T_4$, centered around the time instants 0 and $T_D/2$ (or, for the subsequent periods, $(i-1) \cdot T_D$ and $i \cdot T_D/2$, i being a generic integer); the further reading time intervals $T_1$ and $T_3$ are dedicated to position reading for the detection of the phase error.

In other words, during time intervals $T_1$ and $T_3$, the set of switches 25 is controlled so as to connect the output terminals 16, 18 to the first and second driving terminals 12, 13 and thus to the driving-reading unit 22, and the reading signal $V_R$ is sent by the control unit to the phase-error detector 28. In this case, the reading signal $V_R$ is thus sampled at a sampling frequency $f_c$ equal to four times the driving frequency $f_d$ ($f_c = 4 \cdot f_d$).

It may be shown that at the operating conditions, the phase error $Err_{fi}$ from the ideal phase shift of −90° with respect to the resonance frequency is given by the following expression (which may be obtained by means of linearization operations):

$$Err_{fi} = K_1 \cdot (A(T_1) - A(T_3))$$

where $K_1$ is a first coefficient of proportionality, and the term $A(T_i)$ indicates the amplitude of the reading signal $V_R$ over the time interval $T_i$.

Figure 6:
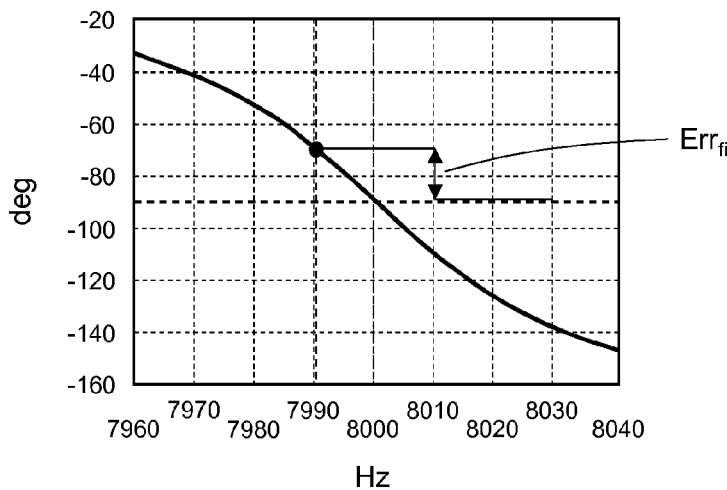
FIGS. 6 and 7 show plots of electrical signals in the driving circuit of the gyroscope device of FIG. 5.

This phase error $Err_{fi}$ is illustrated in FIG. 6, which shows a portion of the phase transfer function, around the resonance condition of −90°. The phase error $Err_{fi}$ may be used, in a known manner, to control the frequency of the driving signals $V_{D1}$, $V_{D2}$.

Figure 7:
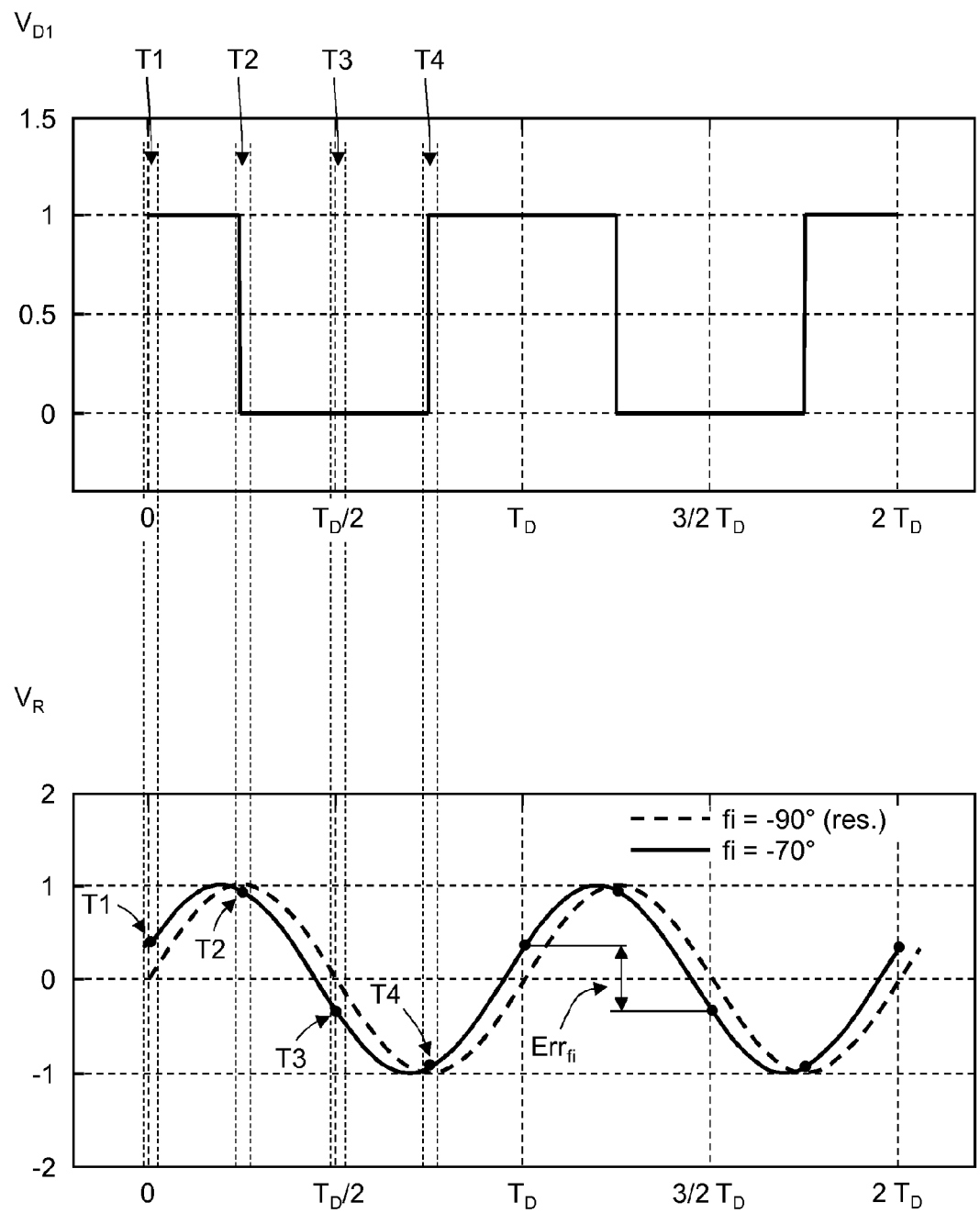

FIG. 7 illustrates the time plots of the various signals involved, for the embodiment just illustrated.

The advantages of the driving circuit and of the microelectromechanical gyroscope according to the present disclosure emerge clearly from the foregoing description.

In any case, it is again emphasized that the solution described requires a single set of electrodes, used both for forcing the system into the resonance condition and for reading (in discrete time) the motion of oscillation to be controlled and to implement a feedback loop, with obvious savings in terms of area occupation and of manufacturing costs.

In addition, the solution described reduces to a minimum the time dedicated to the readings necessary for control of the motion of oscillation and hence maximizes the energy provided to the system during an oscillation cycle.

The driving circuit moreover requires a limited number of electronic components and blocks.

The aforesaid characteristics render the gyroscope device 1 particularly indicated for integration in an electronic apparatus, which may be used in a plurality of electronic systems, for example, in inertial-navigation systems, in automotive systems or in systems of a portable type, such as for example: a PDA (Personal Digital Assistant); a portable computer; a cell phone; a digital audio player; a photographic camera or a video camera; and a controller of a videogame console. The electronic apparatus 1 is in general able to process, store, transmit, and receive signals and information.

Figure 8:
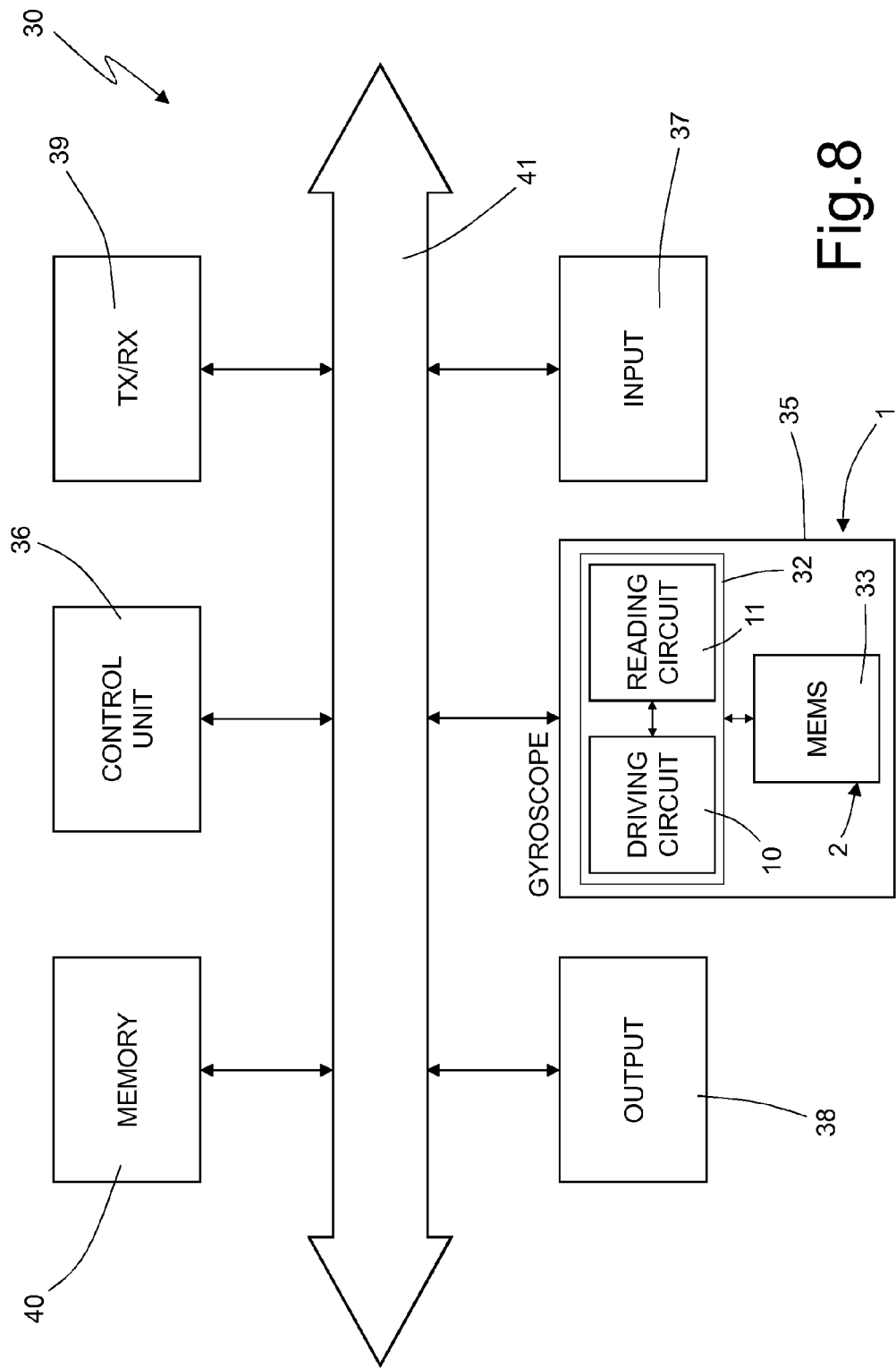
FIG. 8 is a block diagram of an electronic apparatus including the gyroscope device of FIG. 1.

In detail, FIG. 8 shows an electronic apparatus 30, comprising the gyroscope device 1. Advantageously, the driving stage 20 and the driving-reading stage 22 may be obtained in a fully integrated technology (for example of a CMOS or biCMOS type) and be integrated in a single die of semiconductor material, designated as a whole by 32, which may be set, along with a further die 33 of the microelectromechanical detection structure 2, within one and the same package, designated as a whole by 35 (the two dies being electrically and mechanically connected together with known techniques).

The electronic apparatus 30 further comprises: an electronic control unit 36, for example, a microprocessor control unit, connected to the reading stage 11, and designed to supervise general operation of the electronic apparatus 30, for example, also as a function of the angular velocities detected and determined; an input stage 37, provided with suitable data-input elements which may be used by a user (for example, a keyboard); an output stage 38, provided with suitable data-output elements (for example, in the form of a display); a transmitting/receiving stage 39, controlled by the electronic control unit 36 for transmitting and receiving data, for example, with any wireless technique of a known type (such as, for example, Bluetooth, Wifi, IR, etc.); and a memory 40. The various elements of the electronic apparatus 30 may be connected so as to communicate with one another via a data bus 41.

Finally, it is clear that modifications and variations may be made to what has been described and illustrated herein, without thereby departing from the scope of the present disclosure.

In particular, it is evident that the driving signals $V_{D1}$, $V_{D2}$ may have a different waveform; for example, they may be of a sinusoidal type.

Just one pair of readings may moreover be envisaged in the case where it is required to regulate only the amplitude or detect only the phase error of the driving signals $V_{D1}$, $V_{D2}$ (there being consequently envisaged only the time intervals $T_1$, $T_3$ in the first case, or $T_2$, $T_4$ in the second case, which coincides with the first embodiment described).

The microelectromechanical detection structure 2 may moreover have a different configuration, for example, envisaging a rotary driving motion, instead of a linear one.

In general, the gyroscope may have any microelectromechanical structure 2. For example, the solution described may be advantageously exploited in: gyroscopes with one or more sensing masses linearly mobile with respect to the driving mass and sensitive to rotations of pitch and/or roll (in addition to yaw); gyroscopes with cantilever sensing masses or beams oscillating about centroidal or non-centroidal axes; and uniaxial and multiaxial gyroscopes with angularly oscillating driving mass.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A driving circuit, comprising:
    a first output terminal and a second output terminal configured to be coupled to a set of driving electrodes, the driving electrodes being configured to be coupled to a driving mass of a gyroscope and configured to drive the driving mass in resonance condition;
    a driving stage configured to supply driving signals to the first and the second output terminals to cause oscillation in resonance condition of said driving mass;
    a reading stage configured to read the first and the second output terminals to detect movement of said driving mass and implement a feedback control of said driving signals; and
    a switching circuit configured to selectively couple said reading stage to the first and the second output terminals to read the first and the second output terminals and selectively decouple said driving stage from the set of driving electrodes for a discrete-time detection of movement of said driving mass.

2. The driving circuit according to claim 1, wherein the switching circuit includes:
    a first set of switches arranged between the driving stage and the first and the second output terminals, and a second set of switches between the reading stage and the first and the second output terminals; said sets of switches being actuatable to selectively alternatively couple the first and the second output terminals to said driving stage or said reading stage.

3. The driving circuit according to claim 1, further comprising:
a control unit configured to control said switching circuit based on a clock signal; wherein:
said driving circuit is configured to supply said driving signals each as a periodic waveform with a driving period, and
said control unit is configured to cause the switching circuit to couple said driving stage to the first and the second output terminals in a driving portion of said driving period, and to couple said reading stage to the first and the second output terminals in a reading portion of said driving period, distinct from said driving portion.

4. The driving circuit according to claim 3, wherein the reading stage is configured to generate a reading signal during first and second time intervals of said reading portion.

5. The driving circuit according to claim 4, wherein said first and second time intervals are respectively centered around first and second time instants corresponding, respectively, to one quarter and three quarters of said driving period; the driving circuit further comprising an amplitude controller configured to control amplitude values of said driving signals as a function of a difference of amplitude values of said reading signal in said first and second time intervals.

6. The driving circuit according to claim 5, wherein said amplitude controller is configured to determine an amplitude error, according to the expression:

$$Err_{amp}=(A(T_2)-A(T_4))/2-Amp_{ref}$$

where the terms $A(T_2)$ and $A(T_4)$ are the amplitude values of the reading signal in the first and second time intervals, respectively ($T_2$, $T_4$), and the term $Amp_{ref}$ is a reference amplitude of said oscillation; wherein said amplitude controller is configured to control the amplitude values of said driving signals as a function of said amplitude error.

7. The driving circuit according to claim 4, wherein the reading stage is configured to generate the reading signal during third and fourth time intervals of said reading portion.

8. The driving circuit according to claim 7, wherein said third and fourth time intervals are centered, respectively, around an initial instant and a central instant of said driving period; the driving circuit further comprising a phase-error detector configured to determine a phase error as a function of a difference of amplitude values detected by said reading signal in said third and fourth time intervals.

9. The driving circuit according to claim 8, wherein said phase-error detector is configured to determine said phase error according to the expression:

$$Err_{fi}=K_1 \cdot (A(T_1)-A(T_3))$$

where $K_1$ is a coefficient of proportionality, and the terms $A(T_1)$ and $A(T_3)$ are the amplitude values of the reading signal in the third and fourth time intervals ($T_1$, $T_3$), respectively.

10. The driving circuit according to claim 1, wherein said driving signals are periodic square-wave signals or sinusoidal signals.

11. The driving circuit according to claim 1, wherein said reading stage is configured to detect a position of said driving mass as a function of a capacitive variation between mobile electrodes and fixed electrodes of the set of driving electrodes.

12. A gyroscope device, comprising:
a micromechanical detection structure having:
a driving mass configured to be driven in resonance condition;
a set of driving electrodes coupled to the driving mass; and
a sensing mass elastically coupled to said driving mass and configured to enable detection of angular velocity;
a driving circuit, having:
a first output terminal and a second output terminal configured to be coupled to the set of driving electrodes and configured to drive the driving mass in resonance condition;
a driving stage configured to supply driving signals to the first and the second output terminals to cause oscillation in resonance condition of said driving mass;
a reading stage configured to read the first and the second output terminals to detect movement of said driving mass and implement a feedback control of said driving signals; and
a switching circuit configured to selectively couple said reading stage to the first and the second output terminals to read the first and the second output terminals and selectively decouple said driving stage from the set of driving electrodes for a discrete-time detection of movement of said driving mass.

13. The device of claim 12, further comprising:
a first set of switches arranged between the driving stage and the first and the second output terminals, and a second set of switches between the reading stage and the first and the second output terminals; said sets of switches being actuatable to selectively alternatively couple the first and the second output terminals to said driving stage or said reading stage.

14. The device of claim 12, further comprising:
a control unit configured to control said switching circuit based on a clock signal;
said driving signals having a periodic waveform with a driving period, and said control unit being configured to couple said driving stage to the first and second output terminals in a driving portion of said driving period, and to couple said reading stage to said set of driving electrodes in a reading portion of said driving period, distinct from said driving portion.

15. The device of claim 14, further comprising an amplitude controller configured to receive a reading signal, generated by said reading stage, during a first and a second time interval of said reading portion.

16. The device of claim 15, wherein said first and second time intervals are centered around a first and a second instant corresponding, respectively, to one quarter and three quarters of said driving period; and wherein said amplitude controller is configured to control an amplitude value of said driving signals as a function of the difference of the amplitude values assumed by said reading signal in said first and second time intervals.

17. An electronic apparatus, comprising:
a gyroscope device that includes:
a micromechanical detection structure having:
a driving mass configured to be driven in resonance condition;
a set of driving electrodes coupled to the driving mass; and
a sensing mass elastically coupled to said driving mass and configured to enable detection of angular velocity;
a driving circuit, having:

a first output terminal and a second output terminal configured to be coupled to the set of driving electrodes and configured to drive the driving mass in resonance condition;

a driving stage configured to supply driving signals to the first and the second output terminals to cause oscillation in resonance condition of said driving mass;

a reading stage configured to read the first and the second output terminals to detect movement of said driving mass and implement a feedback control of said driving signals; and a switching circuit configured to selectively couple said reading stage to the first and the second output terminals to read the first and the second output terminals and selectively decouple said driving stage from the set of driving electrodes for a discrete-time detection of movement of said driving mass.

18. The apparatus according to claim 17, where the apparatus is one of a PDA; a portable computer; a cell phone; a digital audio player; a photographic camera; a video camera; or a controller of a console for videogames.

19. The apparatus of claim 17, further comprising:

a first set of switches arranged between the driving stage and the first and the second output terminals, and a second set of switches between the reading stage and the first and the second output terminals; said sets of switches being actuatable to selectively alternatively couple the first and the second output terminals to said driving stage or said reading stage.

20. A gyroscopic device, comprising:

a microelectromechanical detection structure, comprising:
a driving mass; and
a pair of driving terminals electrically coupled to the driving mass; and a driving circuit, comprising:
a driving stage configured to supply driving signals to the pair of driving terminals to oscillate the driving mass;
a reading stage configured to read the pair of driving terminals to detect movement of the driving mass; and
one or more switching elements configured to:
electrically couple the driving stage to the pair of driving terminals and electrically decouple the reading stage from the pair of driving terminals during one or more driving time intervals; and
electrically decouple the driving stage from the pair of driving terminals and electrically couple the reading stage to the pair of driving terminals during one or more reading time intervals.

21. The gyroscopic device of claim 20, wherein the pair of driving terminals comprise a solitary pair of driving terminals.

22. The gyroscopic device of claim 20, wherein the driving signals comprise periodic waveforms having a driving period; the one or more reading time intervals comprise a plurality of reading time intervals; and at least one half of the plurality of reading time intervals are respectively centered about a plurality of instants respectively corresponding to one quarter of the driving period and three quarters of the driving period.

23. The gyroscopic device of claim 20, wherein the microelectromechanical structure is set in a first die of semiconductor material, the driving circuit is integrated in a second die of semiconductor material, and the first die and the second die are electrically connected within a same package.

* * * * *